United States Patent [19]
Christensen

[11] Patent Number: 5,895,913
[45] Date of Patent: Apr. 20, 1999

[54] METHOD AND APPARATUS FOR MOVING A CARRIAGE TO A HOME POSITION

[75] Inventor: Michael L. Christensen, Windsor, Colo.

[73] Assignee: Hewlett-Packard Company, Palo Alto, Calif.

[21] Appl. No.: 08/781,781

[22] Filed: Jan. 9, 1997

[51] Int. Cl.[6] ............................. H01J 3/14; H01L 27/00
[52] U.S. Cl. ........................................ 250/235; 250/208.1
[58] Field of Search ................................ 250/234, 235, 250/236, 208.1, 559.29, 559.3; 358/482, 483, 494

[56] References Cited

U.S. PATENT DOCUMENTS

| | | |
|---|---|---|
| 4,709,144 | 11/1987 | Vincent . |
| 4,870,268 | 9/1989 | Vincent et al. . |
| 4,926,041 | 5/1990 | Boyd . |
| 5,038,028 | 8/1991 | Boyd et al. . |
| 5,144,455 | 9/1992 | Stein et al. ........................... 358/443 |
| 5,227,620 | 7/1993 | Elder, Jr. et al. . |
| 5,719,404 | 2/1998 | Tsai ...................................... 250/234 |

*Primary Examiner*—Edward P. Westin
*Assistant Examiner*—Kevin Pyo

[57] ABSTRACT

Apparatus for sensing an initial position of a moveable carriage mounted within a housing of an imaging device may comprise a detector having a plurality of light sensitive elements for detecting objects within a field of view. At least one of the light sensitive elements is an image sensing element and at least one of the light sensitive elements is a position sensing element. A reference mark is positioned on the housing so that is within the field of view of the position sensing element of the detector when the carriage is at about a home position. An image data processor connected to the detector and responsive to the output signals generated thereby determines whether the reference mark is within the field of view of the position sensing element of the detector.

22 Claims, 5 Drawing Sheets

METHOD AND APPARATUS FOR MOVING A CARRIAGE TO A HOME POSITION

FIELD OF INVENTION

This invention relates to optical scanners in general and more particularly to position sensing devices for optical scanners.

BACKGROUND

Imaging devices, such as optical scanners, are well-known in the art and produce machine-readable image data signals which are representative of a scanned object, e.g. a page of printed text. The image data signals may then be digitized and/or stored for later use. For example, the image data signals may be used by a personal computer to produce an image of the scanned object on a suitable display device, such as a CRT. Alternatively, the image data may be printed on a printer.

A typical imaging device (e.g., an optical scanner), includes illumination and optical systems to illuminate the object and focus a small area of the illuminated object, usually referred to as a "scan line," onto the surface of a photosensitive detector positioned within the scanner. Image data representative of the entire object may then be obtained by sweeping the illuminated scan line across the entire object, either by moving the object with respect to the illumination and optical assemblies or by moving the illumination and optical assemblies relative to the object. The illumination system may include a suitable white light source (e.g., a fluorescent or incandescent lamp) to illuminate the object, whereas the optical system may include a lens assembly to focus the image of the illuminated scan line onto the surface of the detector.

The photosensitive detector array may comprise a charge-coupled device (CCD), although other devices may also be used. A typical CCD may comprise a large number of individual cells or "pixels," each of which collects or builds-up an electrical charge in response to exposure to light. Since the size of the accumulated electrical charge in any given cell or pixel is related to the intensity and duration of the light exposure, a CCD may be used to detect light and dark spots on an image focused thereon. In a typical scanner application, the charge built up in each of the CCD cells or pixels is measured and then discharged at regular intervals known as sampling intervals, which may be about 5 milliseconds or so for a typical scanner, although other sampling intervals may be used.

The term "image light" as used herein refers to the light that is focused onto the surface of the detector array by the lens assembly. Depending on the type of scanner, the image light may be reflected from the document or object being scanned or it may be transmitted through the object or document. The image light is converted into digital signals in essentially three steps. First, each pixel in the detector converts the light it receives into an electric charge. Second, the charges from the pixels are converted into analog voltages by an analog amplifier. Finally, the analog voltages are digitized by the analog-to-digital (A/D) converter. These digital signals may then be processed and/or stored as desired.

Optical scanners and various components thereof are disclosed in U.S. Pat. No. 4,926,041 for OPTICAL SCANNER of David Wayne Boyd; U.S. Pat. No. 4,709,144 for COLOR IMAGER UTILIZING NOVEL TRICHROMATIC BEAM SPLITTER AND PHOTOSENSOR of Kent J. Vincent; U.S. Pat. No. 4,870,268 for COLOR COMBINER AND SEPARATOR AND IMPLEMENTATIONS of Kent J. Vincent and Hans D. Neuman; 5,038,028 for OPTICAL SCANNER APERTURE AND LIGHT SOURCE ASSEMBLY of Boyd, et al.; and U.S. Pat. No. 5,227,620 for APPARATUS FOR ASSEMBLING COMPONENTS OF COLOR OPTICAL SCANNERS of Elder, et al., which are each hereby specifically incorporated by reference for all that is disclosed therein.

Regardless of the configuration of a particular scanner, e.g., whether it is a color or a monochrome (i.e., grayscale) scanner, most such scanners need to know very precisely the location of the physical scan window. Most scanner apparatus typically do this by locating a reference mark on the scanner housing that is very accurately placed with respect to the physical scan window. Once the reference mark is located, the scanner will then know the exact location of the physical scan window and will be ready to scan objects or document.

Most scanners use a sensor, often called a "home sensor," to sense the location of the moveable carriage when the scanner is first turned on. Generally speaking, the home sensor comprises a simple switch, which may be optical or electromechanical, which may be closed when the carriage is located at or close to its rear-most position and open if it is not. Then, if the home sensor switch is closed when scanner is first turned on (i.e., powered-up), the scanner will move the carriage forward until it detects a reference mark that is positioned at some known location relative to the home position. That is, when the carriage is located at about the home position, the scanner will know approximately how far to move the carriage in order to detect the reference mark. If, on the other hand, the home sensor is open when the scanner is first turned on, the scanner will then move the carriage rearward until it detects the reference mark. In either event, once the reference mark is located, the scanner will then "know" the precise location of the physical scan window, and will be ready to scan objects or documents. To sum up, the home sensor is used to obtain a "rough" location of the carriage, while the reference mark is used to obtain a more precise location.

While the foregoing arrangement is effective in allowing the scanner to determine the location of the physical scan window and moving the carriage to the beginning of the window, it requires the use of an additional switch. Besides increasing cost and complexity of the scanner, the use of an additional switch also increases the length of the "tolerance stack." That is, since the home sensor switch is not always accurately located with respect to the reference mark, the home sensor switch must be placed far enough behind the reference mark so that the reference mark can always be detected even in the case where the part tolerances stack up most disadvantageously. Because the worst-case part tolerance stack-up needs to be accommodated the result may be an increase in overall scanner length.

Therefore, a need exists for an improved method and apparatus for moving the carriage of an imaging device to a known initial position upon power-up. That is, for determining the location of the physical scan window.

SUMMARY OF THE INVENTION

Apparatus for sensing an initial position of a moveable carriage mounted within a housing of an imaging device may comprise a detector having a plurality of light sensitive elements for detecting objects within a field of view. At least one of the light sensitive elements is an image sensing element and at least one of the light sensitive elements is a position sensing element. A reference mark is positioned on the housing so that is within the field of view of the position sensing element of the detector when the carriage is at about a home position. An image data processor connected to the detector and responsive to the output signals generated thereby determines whether the reference mark is within the field of view of the position sensing element of the detector.

Also disclosed is a method for moving to a home position a moveable carriage mounted within a housing of an imaging device. The first step is to monitor the position sensing element of the detector. If the reference mark is not detected, then the carriage is moved toward a known position of the reference mark. The carriage is then stopped when the reference mark is detected.

BRIEF DESCRIPTION OF THE DRAWING

Illustrative and presently preferred embodiments of the invention are shown in the accompanying drawing in which.

DETAILED DESCRIPTION OF THE INVENTION

Figure 1:
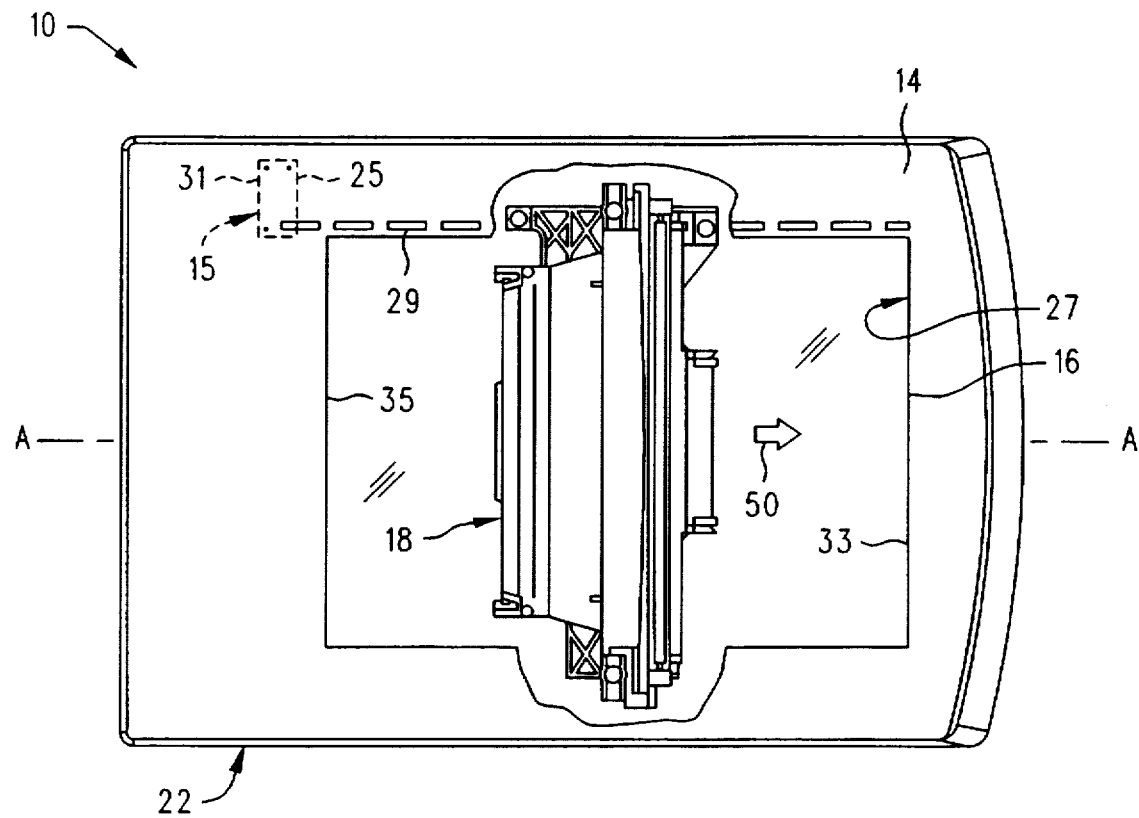
FIG. 1 is a top view of an optical scanner employing an initial position sensor according to the present invention showing the position of the reference mark on the inside surface of the top panel and the moveable carriage assembly.
Figure 2:
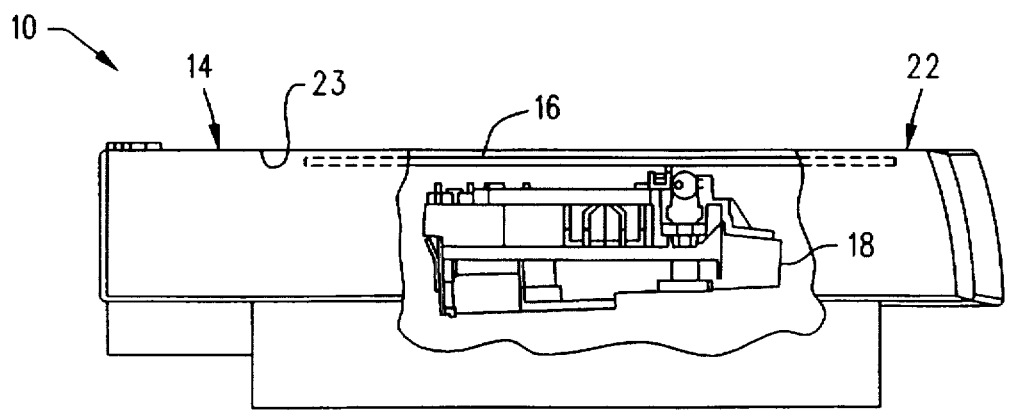
FIG. 2 is a side view in elevation of the optical scanner shown in FIG. 1 with a portion of the side panel broken away to show the position of the moveable carriage assembly.

An initial position sensor 10 according to the present invention is shown in FIG. 1 as it could be used to sense or determine the initial position of a moveable carriage assembly 18 of an imaging device or optical scanner 11 when it is first turned on. Once the initial position is determined, the carriage assembly 18 is moved as necessary to a home position and the scanner 11 is ready for operation.

The initial position sensor 10 utilizes a portion of the same detector array or CCD 62 (FIG. 4) that is used to produce the image data representative of the object being scanned. Specifically, the detector array 62 is positioned so that a small portion 19 of its pixels can detect the presence or absence of a reference mark 15 positioned on an interior surface 23 of a top panel 14 of the scanner 11. Put in other words, the small portion 19 of the detector array 62 defines a field of view 29 that, depending on the position of the carriage assembly 18, encompasses the reference mark 15. The small portion 19 of the detector array 62 is referred to herein as the "position sensing portion" or the "position sensing pixels" of the detector array 62. The adjacent pixels 21 of the detector 62 define a field of view 42 (FIG. 5) commensurate with illuminated scan line and are referred to herein as the "image sensing portion" or the "image sensing pixels."

When the scanner 11 is first turned on, an electronic control and image data processing system 46 (FIG. 6) monitors the position sensing pixels 19 of the detector array 62 to determine whether the reference mark 15 is within the field of view 29 of the position sensing pixels 19. If the reference mark 15 is within the field of view 29 of the position sensing portion 19 of the detector array 62, then the control system 46 knows that the carriage 18 is positioned at or near the home position. On the other hand, if the reference mark 15 is not within the field of view 29 of the position sensing pixels 19, then the control system knows that the carriage 18 is located at some other position. In either event, the electronic control and image data processing system 46 then operates the carriage actuator 20 (FIG. 6) as necessary to move the carriage assembly 18 in the appropriate direction until the control system 46 detects a transition 25 between the reference mark 15 and the interior surface 23 of the top panel 14. The carriage 18 will then be located at the home position and the scanner 11 will be ready to scan a document 12.

An advantage of the present invention is that it eliminates the need to provide a separate home sensor or switch assembly in order to determine the initial position of the moveable carriage assembly.

Figure 4:
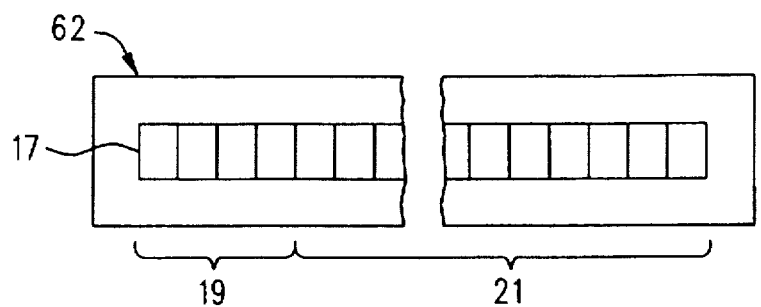
FIG. 4 is a plan view of a detector array showing the position sensing elements and the image sensing elements.
Figure 5:
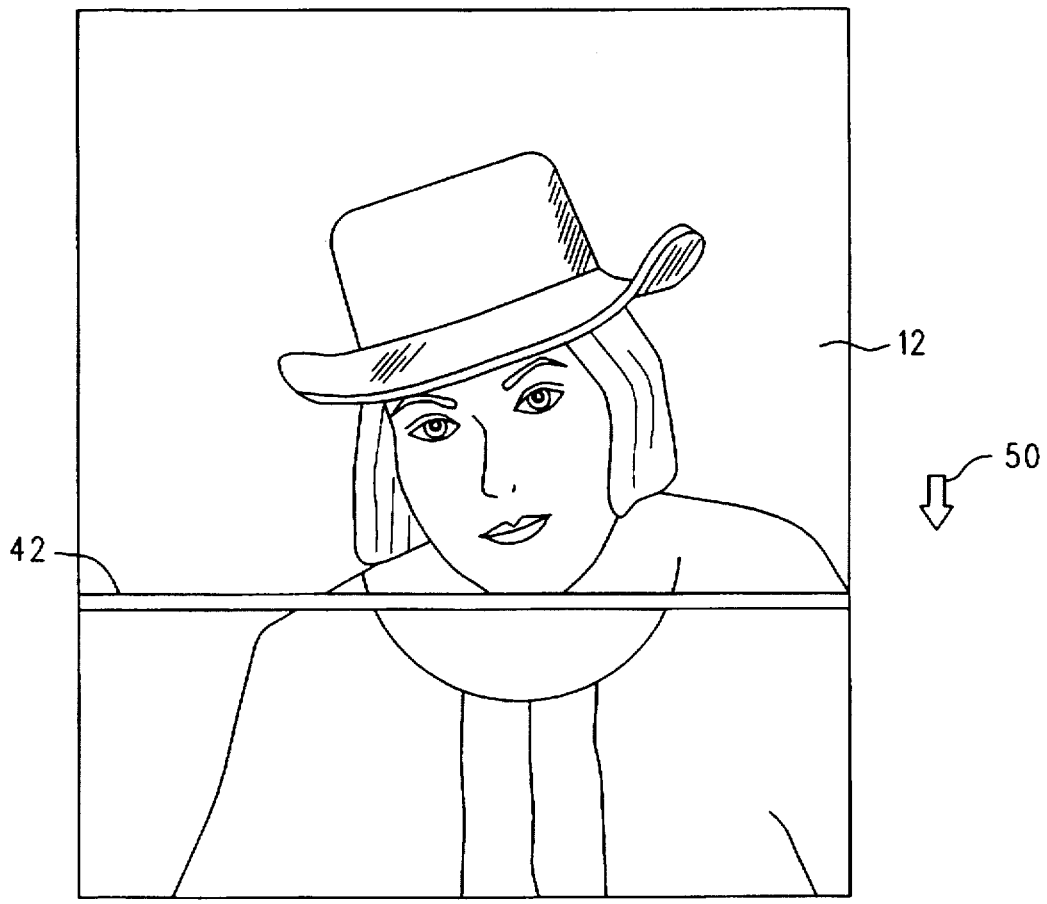
FIG. 5 is a plan view of a document which is being scanned by an imaging device which illustrates the movement of the scan line across the document.

Having briefly described the initial position sensor 10 according to the present invention, as well as some of its more significant features and advantages, the initial position sensor 10 will now be described in detail. Referring now to FIGS. 1–4, the initial position sensor 10 is shown as it could be incorporated into any of a wide range of imaging devices or scanners 11 known in the art for producing machine readable image data representative of an image of an object 12, such as a sheet of paper with graphics provided thereon, as illustrated in FIG. 5. The imaging system or scanner 11 may produce monochrome (i.e., gray-scale) image data or color image data.

In one preferred embodiment, the imaging system or scanner 11 may include a housing 22 having a top panel 14 with an opening or image window 27 therein adapted to receive a transparent platen 16. A moveable carriage 18 positioned below the transparent platen 16 may move back and forth along scanning axis AA to accomplish scanning of a document 12 positioned on the platen 16. In one preferred embodiment, the carriage 18 moves in the forward direction (indicated by arrow 50) to scan the document. Alternatively, the document could be scanned by moving the carriage 18 in the opposite direction.

The window 27 of top panel 14 includes a front end 33 and a rear end 35. The interior surface 23 of top panel 14 also includes a reference mark 15 (shown in phantom) that is located at a known position with regard to the image window 27. Alternatively, the reference mark may be located at a known position with regard to scanning axis AA. In one preferred embodiment, the reference mark 15 is positioned at about the rear end 35 of the scan window 27 and off to one side in the manner shown in FIG. 1. The reference mark 15 is positioned so that its rearward-most extension 31 extends beyond the rearward most position at which the carriage 18 can be located. The forward-most extension or transition line 25 of the reference mark 15 extends to a known position along scanning axis AA. The reference mark 15 is also positioned so that it is within the scanning field of view 29 of the position sensing pixels 19 on the detector array 62, as will be described in greater detail below.

It is preferred that the reference mark 15 have a different reflectance than the interior surface 23 of the top panel 14 so that it can be easily detected by the position sensing pixels 19 and the control system 46. For example, in one preferred embodiment, the interior surface 23 of the top panel 14 is substantially white in color, whereas the reference mark 15 is substantially black in color. However, other colors and/or arrangements may be used without departing from the scope of the invention. For example, if the interior surface 23 of top panel 14 is a dark or black color, then the reference mark may comprise a light or white color. In any event, all that is required is that sufficient contrast exist between the reference mark 15 and the interior surface 23 to allow the two to be easily distinguished by the control system 46.

The reference mark 15 may be affixed to the interior surface 23 of top panel 14 by any convenient means. For example, in one preferred embodiment, the reference mark 15 may comprise a sticker or label that is affixed to the interior surface 23 of the top panel 14 at the appropriate position. Alternatively, the reference mark may be painted on the interior surface 23.

Figure 3:
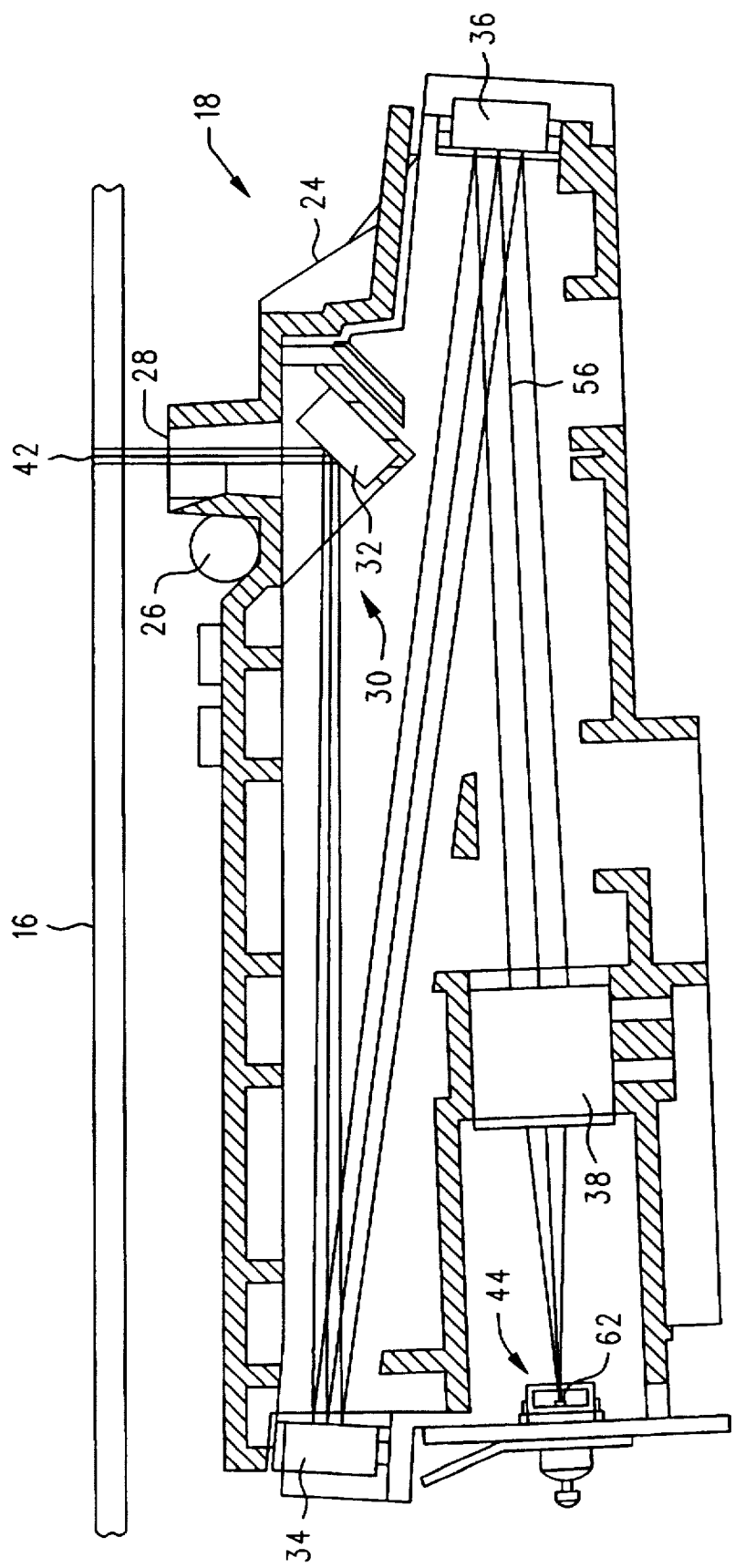
FIG. 3 is a pictorial representation in elevation of the moveable carriage assembly showing the optical system for focusing an image of the scan line onto the detector assembly.

Referring now to FIG. 3, the carriage assembly 18 may comprise a carriage housing 24 adapted to receive a light source assembly 26 and an aperture assembly 28, although a slit aperture assembly is not always required. Carriage assembly 18 also includes the various components of the optical system 30. The carriage assembly 18 is slidably mounted to the scanner housing 22 so that so that it may be moved relative to the transparent platen 16 by a suitable carriage actuator 20 (not shown in FIG. 3, but shown in FIG. 5) in a manner well-known in the art to produce a sweeping scan image of the object 12 at the image sensing portion 21 of the detector or CCD array 62 (FIG. 4). Generally speaking, the carriage actuator 20 may comprise a drive motor (not shown) and a drive belt or cable assembly (also not shown) for moving the carriage assembly 18 back and forth underneath the platen 16 along the scanning axis AA. However, since many different kinds of carriage actuators 20 for accomplishing the foregoing functions are known and available to persons having ordinary skill in the art, and the particular structure of the carriage actuator 20 is not critical in achieving the objects of the present invention, the carriage actuator 20 will not be described in further detail.

The optical system 30 mounted within the carriage assembly 18 may comprise a plurality of mirrors 32, 34, and 36 mounted within the housing 24 so as to define a folded light path 56 that extends from the illuminated scan line 42 of the object 12 (FIG. 5), through aperture 28 and lens assembly 38 and onto the detector assembly 44. The optical system 30 also focuses light reflected by the interior surface 23 and/or reference mark 15 onto the detector assembly 44.

It should be noted that the particular configurations of the carriage and optical assemblies 18 and 30 are not critical in achieving the objects of this invention and any of a wide range of configurations for such assemblies could be used without departing from the spirit and scope of the invention. Therefore, the carriage and optical assemblies 18 and 30 shown and described herein should be considered as being illustrative and generally generic to such assemblies. However, by way of example, the structure of the carriage and optical assemblies 18 and 30 may be similar or identical to those described in U.S. Pat. No. 4,926,041 of Boyd et al. which is specifically incorporated herein by reference for all that it discloses.

In one preferred embodiment, the detector assembly 44 may comprise a light sensitive detector 62 (e.g., a CCD) comprising a linear array of detector elements or pixels 17. In accordance with the present invention, the detector 62 is positioned with respect to the optical assembly 30 so that a small portion 19 of the pixels 17 define a field of view 29 that will encompass the reference mark 15. This small portion of pixels 19 is referred to herein as "position sensing portion" or "position sensing pixels." The remaining portion 21 of the detector elements or pixels 17 define a field of view that encompasses the illuminated scan line 42 (FIG. 5). Accordingly, this remaining portion 21 is referred to herein as the "image sensing portion" or "image sensing pixels."

While the number of pixels or elements 17 comprising the position sensing portion 19 is not particularly critical, the position sensing portion 19 should comprise a sufficient number of pixels to provide a reliable indication of the presence or absence of the reference mark 15 within the field of view 29. Accordingly, in one preferred embodiment, the position sensing portion 19 comprises about sixteen (16) individual detector elements or pixels 17, although more or less pixels could also be used.

Referring now to FIGS. 1 and 5, the scanner 11 may operate to scan an image or document 12 (FIG. 5) positioned on the transparent platen 16 (FIG. 1) by moving the carriage 18 over the document in the forward or scan direction 50. The direction of movement opposite the arrow 50 is referred to herein as the "reverse" or "rearward" direction. Accordingly, the field of view 42 defined by the image sensing portion 21 of the detector 62 sweeps over the image in the scan direction 50. In one preferred embodiment, the carriage 18 moves or scans in the forward direction 50 from the rear end 35 to the front end 33 of the window 27 (FIG. 1), although it could just as easily scan in the opposite or reverse direction.

It should also be noted that while the scanner 11 shown and described herein accomplishes scanning by moving the light source and optical assemblies 26 and 30 (i.e., the carriage assembly 18) with respect to the object 12, it could just as easily accomplish scanning by moving the object 12 with respect to stationary illumination and optical assemblies, as would be obvious to persons having ordinary skill in the art. Such an alternative embodiment would incorporate stationary light source and optical assemblies (not shown) and a moveable platen (not shown) to move the object being scanned with respect to the fixed light source and optical assemblies.

Figure 6:
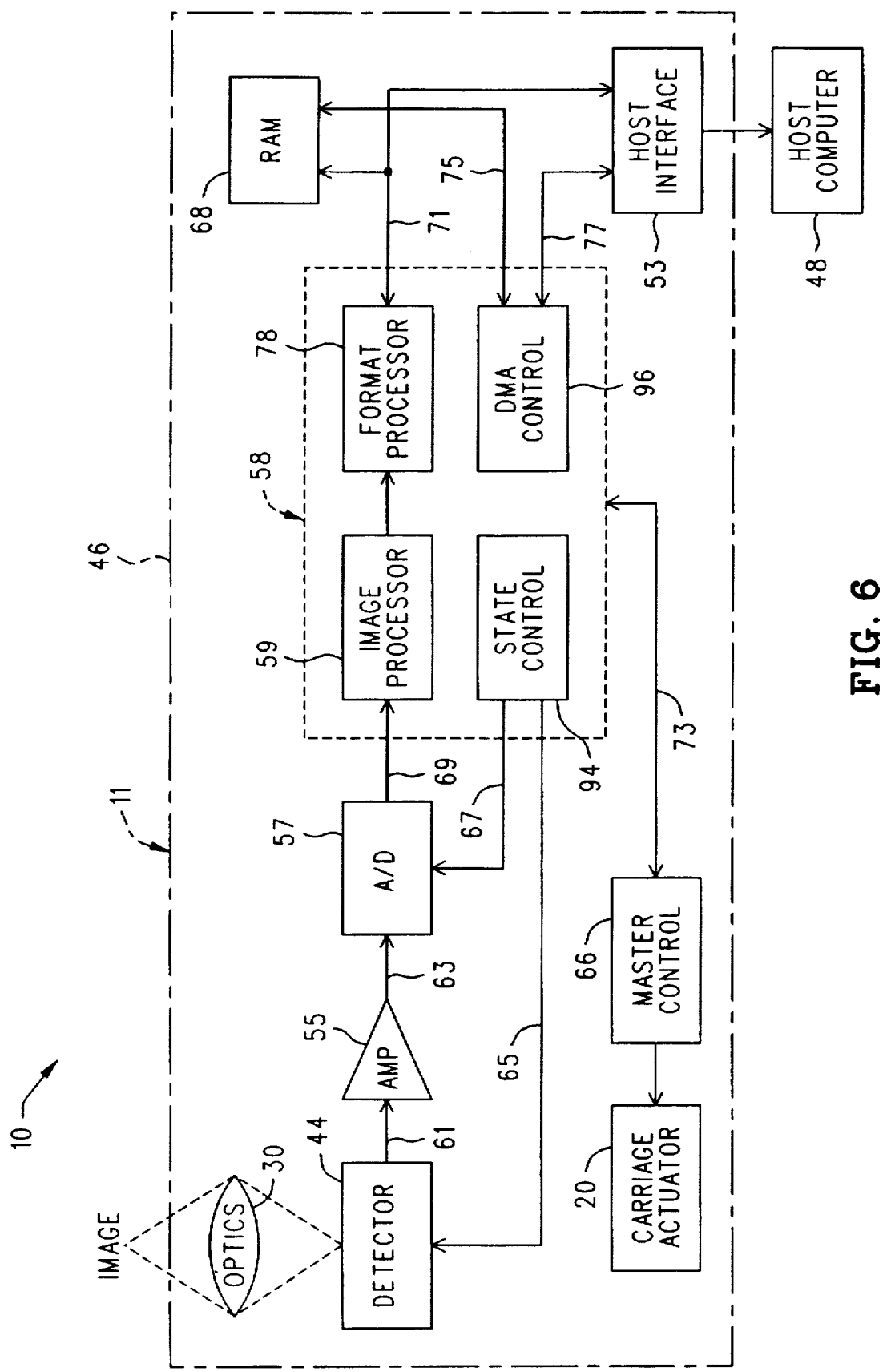
FIG. 6 is a high-level block diagram of the optical scanner shown in FIGS. 1 and 2.

The electronic control and image data processing system 46 captures image data from the image sensing pixels 21 of the detector 62 and processes the captured image data to place it in a form suitable for subsequent processing by the host computer 48. It also monitors the position sensing pixels 19 of the detector 62 to determine whether the reference mark 15 is within the field of view 29. Referring now to FIG. 6, the electronic control and image data processing system 46 may include an analog amplifier 55 connected to the detector array 44 via a suitable line 61. The analog amplifier 55 receives a serial stream of charges from the CCD array 62 (FIG. 4) comprising the detector system 44 (FIG. 3) and sequentially converts each charge to an analog voltage. The analog-to-digital (A/D) converter 57 receives the analog voltages from the amplifier 55 over a line 63 and digitizes them. In one preferred embodiment, the A/D converter 57 produces a 12-bit digital word representing the varying intensity of each pixel.

Slave controller 58 controls the timing of the CCD array 62 (FIG. 4) and A/D converter 57 over respective control lines 65 and 67. Slave controller 58 receives the digitized data from the A/D converter 57 over bus 69, provides any required formatting and image processing and stores the digitized data in RAM 68 via bus 71. In addition, slave controller 58 manages the transfer of data from RAM 68 to the host computer 48 via host interface 53. Host computer 48 may be an image processing system or a general purpose computer. A master controller 66 is provided to initiate an image scanning operation and to set-up and supervise slave controller 58 via bus 73. Master controller 66 also controls the carriage actuator 20.

In one preferred embodiment, slave controller 58 includes an image processor 59, a format processor 78, a state control 94, and a direct memory access (DMA) controller 96. The state control 94 provides clock and other control signals to synchronize the operation of the CCD array 62 and A/D converter 57 via respective control lines 65 and 67. The DMA controller 96 controls the storage and removal of data from RAM 68. DMA controller 96 communicates with RAM 68 via bus 75 and with host interface 53 via bus 77. Image processor 59 provides image processing capabilities, such as, for example, altering the resolution of the digitized image from A/D converter 57. Format processor 78 allows the data format of the digitized image to be changed prior to being stored in RAM 68 and to the host interface 53. For example, format processor 78 may present the data representing the digitized image to RAM 68 in 1, 4, 8, 10 or 12 bits per pixel format.

In one preferred embodiment, slave controller 58 is implemented as an ASIC (application specific integrated circuit). Master controller 66 may comprise a general purpose microprocessor such as a Motorola 68HC11, available from Motorola, Inc., Schaumburg, Ill. CCD array 62 may comprise a Toshiba TCD137C, available from Toshiba America Electronic Components, Inc., Irvine, Calif.

Figure 7:
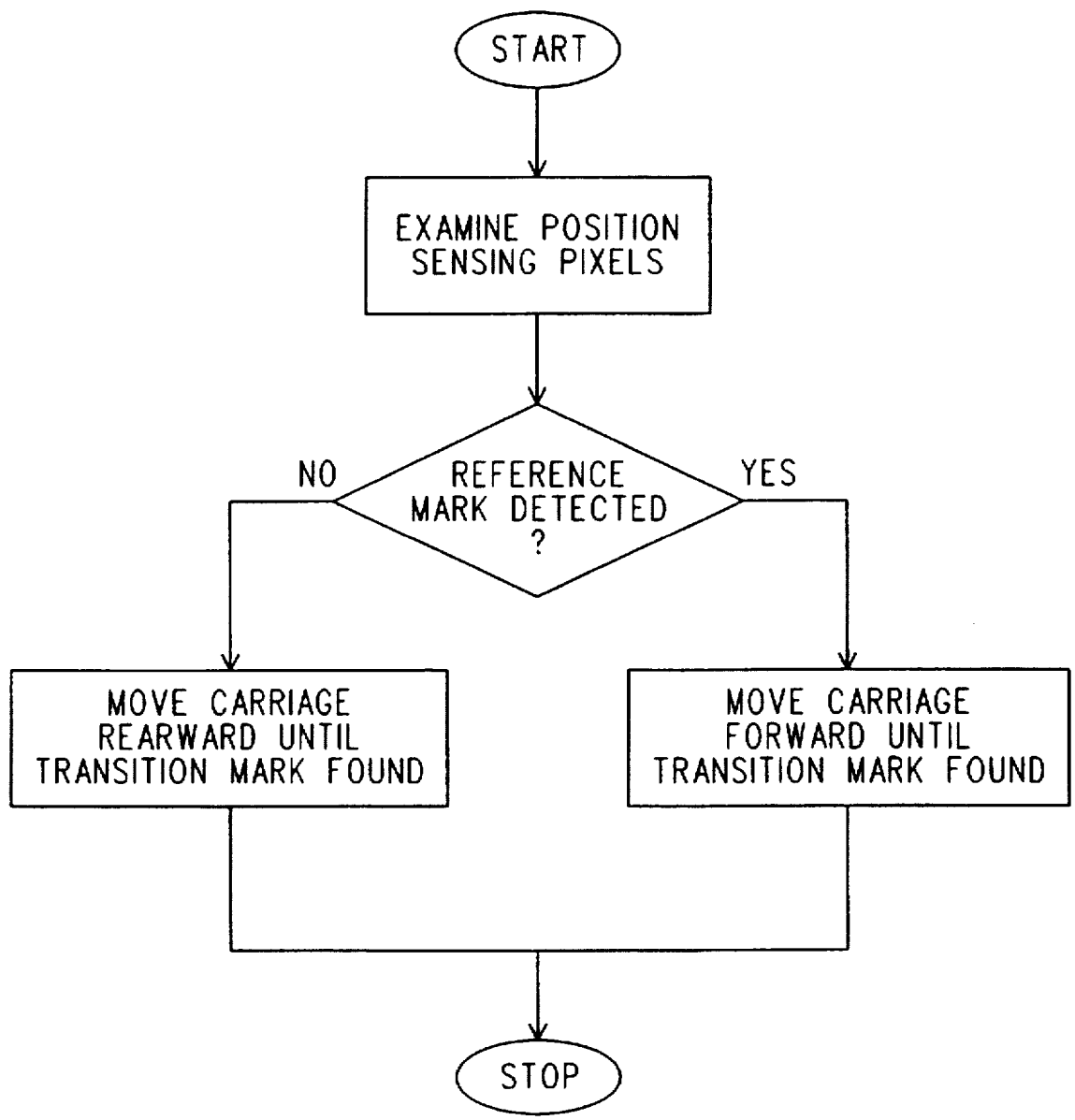
FIG. 7 is a flow chart of a method of determining an initial position according to the present invention.

The operation of the initial position sensor 10 is best seen in FIG. 7 and is described as follows. Upon power-up of the scanner 11, the master controller 66 energizes the light source 26 to illuminate the interior surface 23 of the top panel 14. The image processor 59 then examines the data signals produced by the pixels in the position sensing region 19 of the detector array 62 comprising the detector system 44. If light areas are detected, then the master controller 66 knows that the carriage 18 is at some other position than the home position and actuates the carriage actuator 20 to move the carriage 18 in the rearward direction, i.e., opposite arrow 50. The position sensing pixels 19 are continuously monitored by the image processor 59 until the transition 25 of the reference mark 15 is detected (i.e., until the position sensing pixels 19 become "dark"). At this point, the master controller 66 would command the carriage actuator 20 to stop moving the carriage 18. The carriage 18 is now positioned at the home position and the scanner 11 is ready to scan documents.

If, on the other hand, the position sensing pixels 19 are dark upon initial power-up, then the carriage 18 is positioned at or near the home position. The master controller 66 then actuates the carriage actuator 20 to move the carriage 18 in the forward direction (i.e., in the direction of arrow 50) until the transition 25 is just detected. The carriage 18 is now positioned at the home position and the scanner 11 is now ready to scan documents.

It should be noted that if the design of the carriage actuator 20 is such that the carriage 18 might "overshoot" the transition 25 by a significant distance (particularly when moving in the reverse direction to find the reference mark), then it may prove necessary or desirable for the master controller 66 to move the carriage 18 in the forward direction (i.e., in the direction of arrow 50) until the transition 25 is just detected.

It is contemplated that the inventive concepts herein described may be variously otherwise embodied and it is intended that the appended claims be construed to include alternative embodiments of the invention except insofar as limited by the prior art.

What is claimed is:

1. Apparatus for sensing an initial position of a moveable carriage mounted within a housing of an imaging device, comprising:

a detector having a plurality of light sensitive elements for detecting objects within a field of view, each light sensitive element producing an output signal related to light incident thereon, at least one of the light sensitive elements being an image sensing element and at least one of the light sensitive elements being a position sensing element;

a reference mark positioned on the housing so that said reference mark is within the field of view of the position sensing element of said detector when said carriage is at about a home position; and an image data processor connected to said detector and responsive to the output signals generated thereby for determining whether said reference mark is within the field of view of the position sensing element of said detector.

2. The apparatus of claim 1, including an actuator connected to the moveable carriage and responsive to said image data processor for moving the moveable carriage in response to whether said reference mark is within the field of view of the position sensing element of said detector.

3. The apparatus of claim 1, wherein the position sensing element of said detector is adjacent the image sensing element of said detector.

4. The apparatus of claim 1, wherein the position sensing element of said detector is contiguous to the image sensing element of said detector.

5. The apparatus of claim 1, wherein said detector comprises a plurality of position sensing elements positioned adjacent a plurality of image sensing elements.

6. The apparatus of claim 1, wherein the housing defines an image window and has an interior surface and an exterior surface and wherein said reference mark is positioned on the interior surface of the housing adjacent the image window.

7. The apparatus of claim 1, wherein said image data processor discriminates between the output signal produced by the image sensing element of said detector and the output signal produced by the position sensing element of said detector.

8. The apparatus of claim 1, wherein said detector comprises a charge-coupled device.

9. A method for moving to a home position a moveable carriage mounted within a housing of an imaging device, comprising:

monitoring a position sensing element on a detector having a plurality of light sensitive elements for detecting objects within a field of view, each light sensitive element producing an output signal related to light incident thereon, at least one of the light sensitive elements being an image sensing element and at least one of the light sensitive elements being the position sensing element;

moving the moveable carriage toward a known position of a reference mark if the reference mark is not within the field of view of the position sensing element; and stopping the carriage when the reference mark is within the field of view of the position sensing element.

10. The method of claim 9, further comprising the steps of:

moving the moveable carriage in an opposite direction away from the known position of the reference mark if the reference mark is within the field of view of the position sensing element of said detector; and stopping the moveable carriage as soon as the reference mark is outside the field of view of the position sensing element.

11. Apparatus for moving a moveable carriage to a home position, the moveable carriage being moveable along an axis, comprising:

a detector operatively associated with the moveable carriage, said detector having a field of view and producing an output signal in response to objects located within the field of view;

a reference mark positioned at a fixed location with respect to the moveable carriage so that said reference mark is within the field of view of the detector when the carriage is located at some positions along the axis, said reference mark including a forward-most extension that is located at a known position along the axis;

a control system operatively associated with the moveable carriage and responsive to the output signal produced by said detector, said control system moving the moveable carriage along the axis until said detector detects the forward-most extension of said reference mark.

12. The apparatus of claim 11, wherein the position of the moveable carriage at which said detector detects the forward-most extension of said reference mark corresponds to the home position.

13. The apparatus of claim 11, wherein said reference mark includes a rearward-most extension that extends beyond a rearward-most position at which the field of view of said detector can be located.

14. The apparatus of claim 13, wherein said detector is mounted to the moveable carriage.

15. The apparatus of claim 13, wherein said detector comprises a plurality of light sensitive elements for detecting objects within a field of view, each of the plurality of light sensitive elements producing an output signal in response to light incident thereon, at least one of the plurality of light sensitive elements comprising an image sensing element and at least one of the plurality of light sensitive elements comprising a position sensing element.

16. The apparatus of claim 15, wherein said control system includes an actuator operatively associated with the moveable carriage for moving the moveable carriage along the axis.

17. The apparatus of claim 16, wherein the position sensing element of said detector is adjacent the image sensing element of said detector.

18. The apparatus of claim 17, further comprising a housing having an interior surface, an exterior surface, and an image window therein, wherein the moveable carriage is mounted within said housing so that the image sensing element of the detector is exposed to the image window therein as said moveable carriage assembly is moved along the axis, and wherein said reference mark is positioned on the interior surface of the housing at a position adjacent the image window.

19. Apparatus for moving a moveable carriage to a home position, the moveable carriage being moveable along an axis, comprising:

detector means operatively associated with the moveable carriage for detecting objects within a field of view;

reference mark means positioned at a fixed location with respect to the moveable carriage, said reference mark means being within the field of view of said detector means when the moveable carriage is located at some positions along the axis, said reference mark means including forward-most extension means located at a known position along the axis;

control means operatively associated with said detector means and the moveable carriage for determining whether said reference mark means is within the field of view of said detector means and for moving the moveable carriage along the axis until said detector means detects the forward-most extension means of said reference mark means.

20. A method for moving a moveable carriage to a home position, the moveable carriage being moveable along an axis, comprising:

providing a detector to the moveable carriage assembly so that a field of view associated with the detector moves with the moveable carriage;

placing a reference mark at a fixed position with respect to the moveable carriage so that the reference mark is within the field of view of the detector when the carriage is located at some positions along the axis, the reference mark including a forward-most extension that is located at a known position along the axis; and monitoring the detector while moving the moveable carriage along the axis until the forward-most extension of the reference mark is within the field of view of the detector.

21. The method of claim 20, further comprising:

providing the reference mark with a rearward-most extension that extends beyond a rearward-most position at which the field of view of said detector can be located.

22. The method of claim 21, further comprising:

monitoring the detector to determine whether the reference mark is located within or outside the field of view of the detector;

moving the moveable carriage in a rearward direction along the axis if the reference mark is outside the field of view of the detector until the forward-most extension of the reference mark is within the field of view of the detector; and moving the moveable carriage in a forward direction along the axis if the reference mark is within the field of view of the detector until the forward-most extension of the reference mark is within the field of view of the detector.

* * * * *